United States Patent
Tsillas et al.

(10) Patent No.: US 7,760,652 B2
(45) Date of Patent: Jul. 20, 2010

(54) METHODS AND APPARATUS FOR IMPROVED FAILURE RECOVERY OF INTERMEDIATE SYSTEMS

(75) Inventors: Demetrios James Tsillas, Littleton, MA (US); Diana Y. Moy, Wayland, MA (US)

(73) Assignee: Enterasys Networks, Inc., Andover, MA (US)

( * ) Notice: Subject to any disclaimer, the term of this patent is extended or adjusted under 35 U.S.C. 154(b) by 1931 days.

(21) Appl. No.: 10/123,637

(22) Filed: Apr. 16, 2002

(65) Prior Publication Data

US 2003/0193890 A1 Oct. 16, 2003

(51) Int. Cl.
*H04L 12/26* (2006.01)
(52) U.S. Cl. .................. 370/242; 370/216; 370/252
(58) Field of Classification Search .......... 370/216, 370/242, 252, 255
See application file for complete search history.

(56) References Cited

U.S. PATENT DOCUMENTS

| | | | | |
|---|---|---|---|---|
| 6,590,868 B2 * | 7/2003 | Shen | ................... | 370/242 |
| 6,654,359 B1 * | 11/2003 | La Porta et al. | ............. | 370/328 |
| 6,785,843 B1 * | 8/2004 | McRae et al. | .................. | 714/23 |
| 6,898,189 B1 * | 5/2005 | Di Benedetto et al. | ...... | 370/256 |
| 6,934,247 B2 * | 8/2005 | Bhattal et al. | ............... | 370/216 |
| 7,139,278 B2 * | 11/2006 | Gibson et al. | ............... | 370/401 |
| 7,174,387 B1 * | 2/2007 | Shand et al. | ................ | 709/238 |
| 7,218,605 B2 * | 5/2007 | Ochiai et al. | ................ | 370/216 |
| 2002/0004843 A1 * | 1/2002 | Andersson et al. | .......... | 709/238 |
| 2003/0072270 A1 * | 4/2003 | Guerin et al. | ............... | 370/254 |

* cited by examiner

*Primary Examiner*—Michael J Moore, Jr.
(74) *Attorney, Agent, or Firm*—Lando & Anastasi, LLP

(57) ABSTRACT

Methods and apparatus relating to intermediate system recovery to reduce the required amount of computational resources and network bandwidth to recover an intermediate system after an operational failure. The intermediate system conceals its operational failure from neighboring systems and queries them for information sufficient to simplify the reconstruction of its routing information. The intermediate system can interoperate with existing neighbor intermediate systems that have not implemented the invention allowing the benefit and convenience of incrementally deploying embodiments of the present invention. Embodiments of the present invention include but are not limited to intermediate systems that use IS-IS and BGP protocols.

40 Claims, 4 Drawing Sheets

# METHODS AND APPARATUS FOR IMPROVED FAILURE RECOVERY OF INTERMEDIATE SYSTEMS

FIELD OF THE INVENTION

The present invention relates generally to the reinitialization of network equipment operating in a network environment. In particular, the present invention relates to methods and apparatus for intermediate system recovery with improved bandwidth conservation, stability characteristics, and transparent operation.

BACKGROUND OF THE INVENTION

Most business organizations satisfy their computing needs using computer networks, i.e., large numbers of individual computers and other networked devices interconnected for the exchange of information. These networks themselves are typically interconnected to facilitate the exchange of information (such as e-mail and data files) within and between business organizations.

One example of a network of interconnected networks is presented in FIG. 1. An individual computer network $100^1$, $100^2$, $100^3$, $100^4$ (generically 100) typically includes one or more computers or other end system devices typically connected using a shared or switched network using a medium access control (MAC) protocol such as Ethernet or token ring. The networks 100 are representative of local area networks (LANs) that exist in business enterprises. The end system devices in computer network 100 may include, for example, mainframe computers, minicomputers, personal computers, network computers, printers, file servers, and network-enabled office equipment. Each end system device on a network 100 is associated with one or more addresses that can identify the data it has sent or serve as an identifier for data it is intended to receive.

The networks $100^1$, $100^2$, $100^3$, $100^4$ connect with a series of routers $104^1$, $104^2$, $104^3$, $104^4$ (generically 104) at network connections. These network connections are typically dedicated point-to-point circuits (i.e., PPP, HDLC, T1) or virtual circuits (i.e., Frame Relay, ATM, MPLS). Two or more routers 104 may be interconnected using telecommunications lines that span greater distances that form a wide area network (WAN) $110^1$, $110^2$ (generically 110). A router 104 is a specialized computer that, generally speaking, directs the exchange of data among devices on different computer networks 100 or between other routers 104 as shown in FIG. 1. For example, router $104^1$ takes data from a first network $100^1$ and forwards it to a second router $104^4$ and a third router $104^2$ towards network $100^2$. Some routers 104 are multiprotocol routers that execute several routing protocols independently (e.g., OSPF, IS-IS, RIP). The router 104 maintains information in a routing table identifying which groups of addresses are associated with particular network connections. Note that routers 104 can also exist within networks 100 interconnected with local area network technology (e.g., Ethernet, token ring).

In normal operation, a router 104 is subject to various failure modes that render it unable to transfer data between its connected networks 100. These failure modes include but are not limited to physical severance of the connection between the router 104 and another router 104 or one or more of its connected networks 100, an error in the software internal to the router 104, physical damage to the router 104, loss of power, or another hardware problem with the router 104. If router 104 fails in a way that is amenable to recovery—e.g., a software failure or a transient hardware failure—the router 104 can reset and reinitialize itself for operation.

During the reinitialization process neighboring routers $104^1$, $104^2$, and $104^3$ typically detect the failure of router $104^4$. Each router 104 will typically broadcast a route update message to the other routers 104. For example, a BGP router will provide an update including a withdrawn path identifying the failed router 104 as well as a replacement routing path circumventing the failed router 104. Unfortunately, this transmission of control traffic consumes time and bandwidth otherwise available to carry data between networks 100. If the update messages from different routers 104 should occur at the same time, significant amounts of network bandwidth may be commandeered for the transmission of control traffic.

In response to these update messages, routing paths are recomputed to circumvent router $104^4$. For example, router $104^1$ may alter its routing tables to use routers $104^3$ and $104^2$ to reach network $100^1$, instead of using router $104^4$. Typically each router 104 will detect the failure and begin route re-computation at approximately the same time. This recomputation consumes processor time on the router's control plane reducing the computational resources available for other management functions.

Moreover, it is not unusual for a router 104 to announce a new path in an update message, simultaneously receive a message from another router 104 invalidating the newly-announced path, and subsequently issue another message withdrawing the path it has just announced, before computing and announcing a new path. This phenomenon is referred to as "network flap" and it potentially has several detrimental effects on network operations. As discussed above, network flap consumes computational resources and network bandwidth. Network flap can also destabilize neighboring routing domains, causing network destinations to be "unreachable" for significant periods of time, thereby disrupting data traffic.

Therefore, there is a need for improved router recovery mechanisms that require reduced computational resources and less bandwidth than prior art recovery mechanisms. Moreover, these mechanisms should operate without destabilizing neighboring routing domains, and should not depend on the retrofitting or modification of currently-deployed network protocols. The present invention provides methods and apparatus related to such mechanisms.

SUMMARY OF THE INVENTION

The present invention provides methods and apparatus related to intermediate system recovery that can reduce the required amount of computational resources and network bandwidth for an intermediate system to recover from a transient operational failure. In summary, the intermediate system conceals its operational failure, rendering its failure and recovery transparent to its neighboring systems. The failed system subsequently queries its neighbors for information sufficient to simplify the reconstruction of its routing information. The transparency of recovery allows this feature to be incrementally deployed in a network without requiring the installation of this feature in all of the intermediate systems in the network to realize the benefits of the present invention.

In one aspect, the present invention is a method for recovering from the operational failure of an intermediate system. The method includes the steps of reinitializing a first intermediate system, suppressing the detection of the reinitialization by a second intermediate system, and querying at least a third intermediate system for routing information. The second and third intermediate system may be the same intermediate system. In one embodiment, the method further includes the step of establishing a connection between the first intermediate system and the third intermediate system. The step of establishing the connection may include the step of verifying a pre-existing connection with the third intermediate system. The step of establishing the connection may also include the step of retrieving connection information from a nonvolatile storage mechanism or a microprocessor subsystem that may be configured in a redundant or standby fashion.

In another embodiment, the method further includes the step of receiving routing information from the third intermediate system. The routing information may include a list of network layer addresses directly reachable from the third intermediate system. The method may also include the step of generating a routing table from the received routing information. In one embodiment, the routing table may be generated from the received routing information at a control plane. In another embodiment, a forwarding table may be generated from the routing table. In yet another embodiment, the forwarding table may be provided to a data plane. In still another embodiment, the forwarding table may be used to forward data. The received routing information may be compared with retained routing information. Routing information queries may be generated based on the result of this comparison. In one embodiment, the routing information queries may include at least one "partial sequence numbers" protocol data unit (PDU).

In yet another embodiment, the step of suppressing detection of the reinitialization includes suppressing messages to the second intermediate system relating to the reinitialization of the first intermediate system. In another embodiment, the step of suppressing detection includes routing data using a data plane in accord with a last-received forwarding table. In still another embodiment, the step of suppressing detection includes transmitting control messages to the second intermediate system. The step of reinitializing the first intermediate system may include recovering information from a nonvolatile storage mechanism or a microprocessor subsystem that may be configured in a redundant or standby fashion.

In one embodiment, the first, second and third intermediate systems are intermediate systems using intermediate system-intermediate system (IS-IS) protocol. In this embodiment, the step of querying at least a third intermediate system may include transmitting at least one "complete sequence numbers" PDU to the third intermediate IS-IS system. The step of suppressing detection may include the transmission of "hello" PDUs at a frequency sufficient to convince the second intermediate IS-IS system that the first intermediate IS-IS system has not experienced an operational failure. In one embodiment, the transmission of "hello" PDUs may halt if the first intermediate IS-IS system fails to complete reinitialization within a predetermined period of time, for example, on the order of 30 seconds. In another embodiment, the transmission of "hello" PDUs is halted if the first intermediate IS-IS system fails to complete reinitialization within a predetermined period of time and all of the active neighboring intermediary systems have been polled. In another embodiment, the step of suppressing detection includes transmitting a link state advertisement (LSA) with a sequence number contiguous and sequential with the sequence number of the last LSA sent by the first intermediate IS-IS system before the operational failure. This step may further include retrieving the sequence number of the last LSA sent by the first intermediate IS-IS system before the operational failure from a nonvolatile storage mechanism or a microprocessor subsystem that was not reset by the operational failure.

In another embodiment, the first, second, and third intermediate systems are intermediate systems using border gateway protocol (BGP). The step of establishing a connection may include the steps of retrieving one or more of the send and receive sequence pointers, the received window lengths, and any data awaiting acknowledgment from a nonvolatile storage mechanism, and entering the retrieved TCP state. In one embodiment, the method may further include the step of applying the available options and control information to reconstruct the internet layer attributes, the TCP layer attributes, or the socket layer attributes. In another embodiment, the method may further include the step of responding to data awaiting acknowledgment. In still another embodiment, the step of querying at least a third intermediate system includes the transmission of route-refresh (RR) messages to the third intermediate system. The step of generating a routing table may occur after the receipt of at least one refresh message or after the lapse of a predetermined period of time. The updated routing information may be provided to another intermediary system. In one embodiment, the method further includes the step of comparing the generated routing information with retained routing information. Outdated routing information may be deleted and updated routing information may be provided to another intermediate system.

BRIEF DESCRIPTION OF THE DRAWINGS

The invention is identified with particularity in the claims. The advantages of the present invention may be better understood by referring to the following description and the accompanying drawings, in which:

In the drawings, like reference characters generally refer to the same parts throughout the different views. The drawings are not necessarily to scale, emphasis instead being placed upon illustrating the principles of the invention.

DETAILED DESCRIPTION OF THE INVENTION

Figure 1:
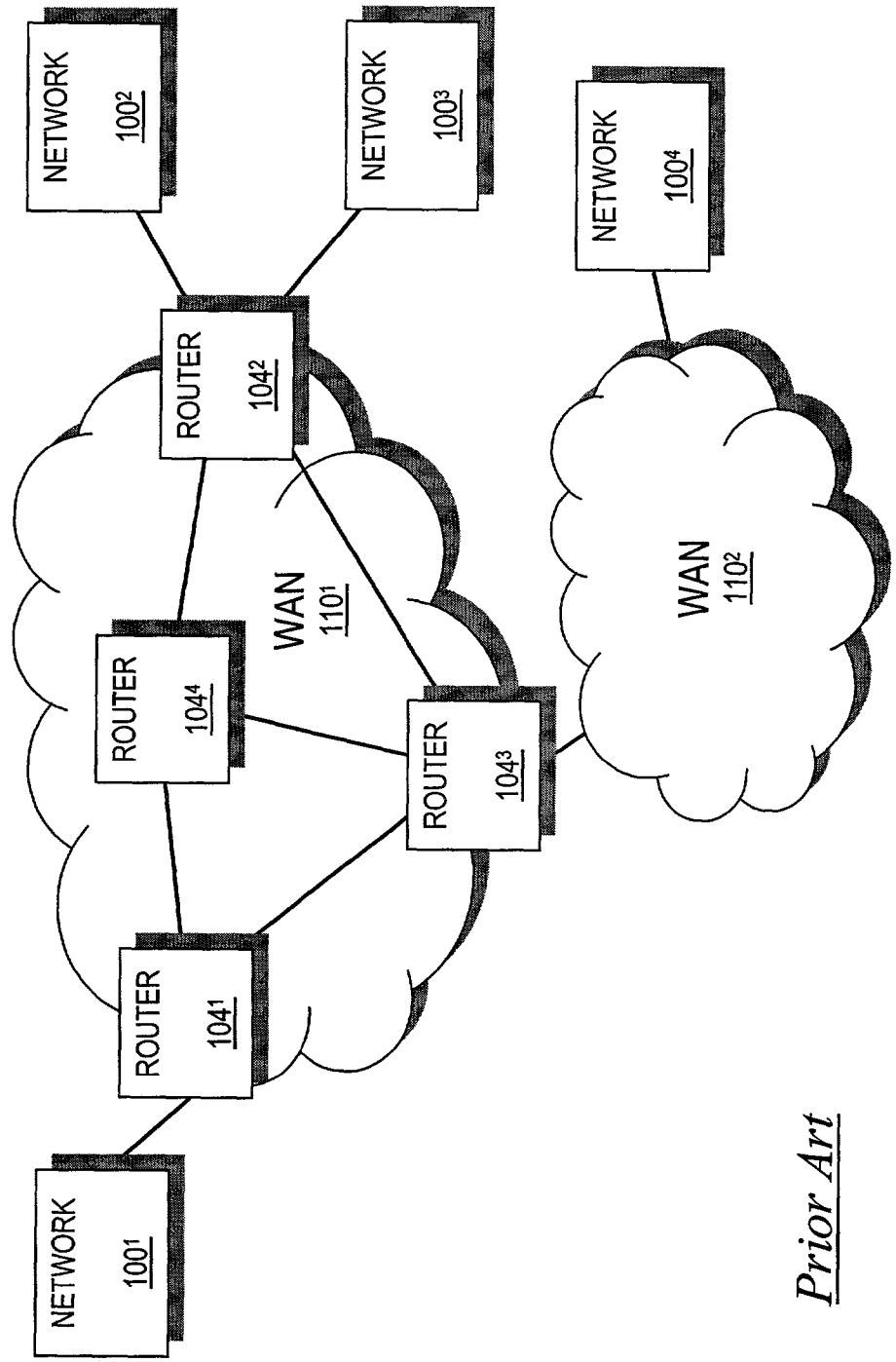
FIG. 1 schematically illustrates a prior art network of networks, where devices on individual networks 100 communicate through interconnecting routers 104.

Applicant's invention exploits features of network protocols to enable an intermediate system to transparently recover from an operational failure and rebuild its routing information tables. The intermediate system obtains data from its neighbor intermediate systems—i.e., its "neighbor systems" or "neighbor intermediaries"—and uses this information in the recovery process. It simultaneously suppresses detection of its own failure or reinitialization, thereby avoiding network flap or recomputation of routing information by its neighbor systems. The present invention may be implemented on a single intermediate system, avoiding the need to modify intermediate systems subject to another's control or ownership.

An intermediate system is understood to be electronics, software, or any combination thereof that permits the transfer of data between computer networks. Such intermediate systems include but are not limited to dedicated routers, telecommunications switches, or any other general-purpose or special-purpose computer capable of executing a stored program to provide such data transfer functionality.

The intermediate system typically includes one or more processing units logically organized into one or more control planes and one or more data planes, each plane having one or more processing units. The control planes contain one or more copies of the current routing table, which they use to generate forwarding tables for the data planes' operation. The control planes also send and receive routing table updates to and from neighboring intermediate systems using control messages. The data planes utilize forwarding tables from the control planes to identify the appropriate forwarding network connection for received data and send the data to that connection, typically via a mesh interconnect such as a switching fabric.

In the intermediate system, an operational disruption can affect either a control plane or a data plane. For example, a maintenance action, such as a software update or a hardware update or replacement, can affect control plane or data plane operation. A failure on a data plane, e.g., a transient hardware failure or a software problem, can also destroy the forwarding table and temporarily render the data plane inoperative. Recovery in this situation requires the reinitialization or replacement of the data plane and the provision of a new forwarding table from the control plane. Typically, the other data planes in the system continue to operate, receiving and forwarding data in accord with their normal operation, unaffected by the failure of one data plane. There is a window of recovery, on the order of several seconds, such that these data plane disruptions do not affect the routing protocols running in the control plane.

However, a disruption on a control plane due either to a failure or a hardware or software maintenance operation can destroy the routing table, requiring its reconstruction upon reinitialization. In a prior art intermediate system, after a control plane failure destroys the routing table the system reinitializes itself, sends a message to neighboring intermediate systems signaling its reinitialization, and begins the process of reconstructing its routing table. The intermediate system and its neighbors begin the exchange of routing information until all the intermediate systems have the same routing information, whereupon each intermediate system recomputes its routing table. This exchange of information consumes computational resources, network bandwidth, and potentially causes network flap, as discussed above. Then, the intermediate systems use their routing tables to create the appropriate forwarding tables for their data planes.

Figure 2:
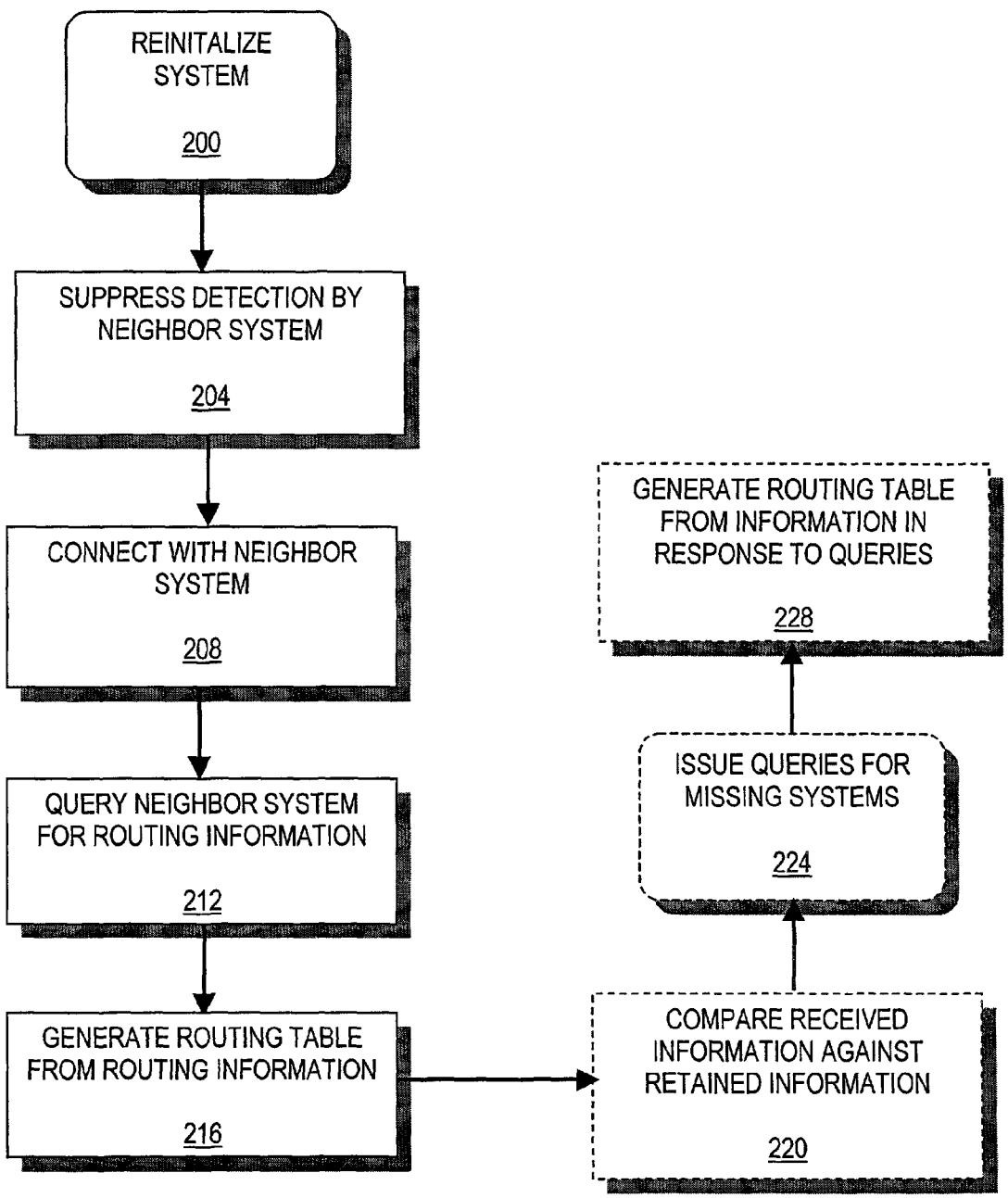
FIG. 2 is a flowchart illustrating an embodiment of a method for intermediate system recovery from an operational failure in accord with the present invention.

In accord with the present invention, an intermediate system operates normally until it experiences an operational disruption affecting its routing table. With reference to FIG. 2, upon experiencing the disruption the system either receives a command from an operator to reinitialize its control plane or automatically begins its own reinitialization (Step 200). In one embodiment, the reinitialization step involves the recovery of information from a nonvolatile storage mechanism such as, but not limited to, a nonvolatile memory, a battery-backed RAM, a FLASH memory, a hard disk, a memory that was not reset during or after an error condition, a dedicated or backup processor subsystem, or their functional equivalents.

Before, during, and after reinitialization (Step 200), the intermediate system actively or passively suppresses detection of its reinitialization by its neighbor systems (Step 204). In one embodiment, the intermediate system passively suppresses detection by not transmitting a message to its neighbor systems that would signal its reinitialization. In another embodiment, the intermediate system passively suppresses detection by continuing to route data using one or more of its data planes in accord with the most-recently received forwarding tables held by the data plane, permitting communications with the associated computer network. In yet another embodiment, the intermediate system actively suppresses detection by transmitting control messages to neighbor intermediate systems as if the intermediate system had not experienced an operational failure.

After the intermediate system has completed reinitialization, the system establishes a connection with one or more of its neighbor systems (Step 208). In one embodiment, this step entails the verification or maintenance of a connection with the neighbor systems that was established before the operational failure. In another embodiment, the maintenance of this connection requires the reconstruction of state information associated with the connection, e.g., TCP state, using information from a nonvolatile storage mechanism such as, but not limited to, a nonvolatile memory, a battery-backed RAM, a FLASH memory, a hard disk, a memory that was not reset during or after an error condition, a dedicated or backup processor subsystem, or their functional equivalents.

Using the connection, the system queries its neighbor systems for routing information (Step 212). In response to the query, the neighbor systems provide routing information to the reinitialized system. Using the received information, the reinitialized system generates a routing table (Step 216), typically at a control plane, which it then uses to generate forwarding tables for one or more data planes. The data planes may use the forwarding tables to forward data.

In one embodiment, if the intermediate system retained any routing information during the reinitialization process, it compares the received information against the retained information (Step 220). To the extent this comparison indicates a deficiency in the information received from the neighboring systems (such as a missing host) the intermediate system will query one or more neighbor systems for routing information concerning the missing devices (Step 224). In this embodiment, the intermediate system generates the routing table using the information supplied by the neighbor systems in response to the issued queries (Step 228).

The implementation of the particular steps in this method will vary according to the details of the specific protocols supported by the intermediate system and the particular protocol chosen to implement the mechanisms of the present invention. For example, it is within the scope of the present invention to implement the steps of the method using a particular network protocol, as discussed in detail below. It is also within the scope of the present invention to implement the steps of the method using multiple network protocols. So long as the functions of the invention—namely, suppressing detection of system failure during reinitialization and/or external querying—are realized, the protocols and communication patterns utilized are not critical. As a result, a major benefit of the invention is that it is transparent to existing intermediate systems deployed in a network, permitting the deployment of this feature in networks with multiple intermediate systems without requiring an update to all of the deployed intermediate systems to realize the benefits of the invention.

Figure 3:
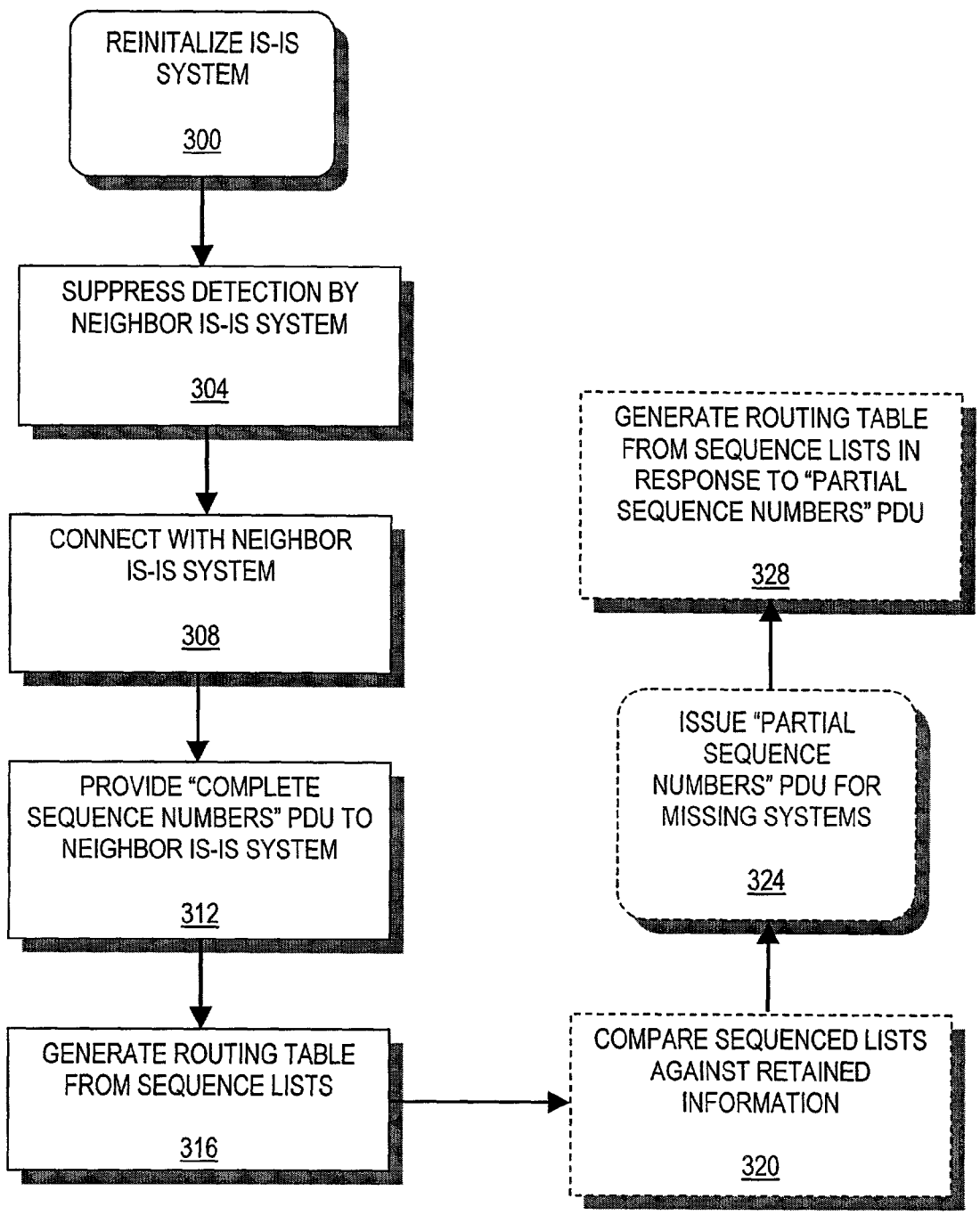
FIG. 3 is a flowchart illustrating an embodiment of a method for intermediate IS-IS system recovery from an operational failure in accord with the present invention.

FIG. 3 illustrates an embodiment of the present invention directed to intermediate systems that utilize the IS-IS protocol. The IS-IS protocol is a link-state protocol used for routing internet protocol (IP) and connectionless network protocol (CLNP) packets. Each intermediate IS-IS system announces through link state advertisements (LSAs) the network layer addresses that it can reach directly. Using the LSAs received from neighbor intermediate systems, an intermediate system can determine the network topology and the shortest paths through the network. The IS-IS protocol is described in detail in ISO Standard 10589, the entire contents of which are incorporated herein by reference.

As discussed earlier, before, during, and after reinitialization (Step 300), the intermediate IS-IS system actively or passively suppresses detection of its reinitialization by its neighbor IS-IS systems (Step 304). In one embodiment, the intermediate IS-IS system passively suppresses detection by continuing to forward data during reinitialization using one or more of its data planes in accord with the most-recently received forwarding tables held by the data plane, permitting communications with the associated communications network. In another embodiment, the intermediate IS-IS system actively suppresses detection by continuing to send "hello" protocol data units (PDUs) at a frequency sufficient to convince neighboring IS-IS systems that the reinitializing IS-IS system has not experienced an operational failure—e.g., once every three seconds. However, if the time required for reinitialization exceeds a predetermined value or there are no more active adjacencies to other intermediate systems from which to retrieve current routing information, it is unlikely that the system will ever reinitialize without outside assistance or, when it does, the routing information it will contain will be so outdated as to require the updating of the routing table by performing a cold start. In the event that the intermediate system fails to reinitialize before the lapse of this predetermined time interval or there are no more active adjacencies to other intermediate systems, the intermediate system halts the transmission of "hello" PDUs. In one embodiment, this time interval is on the order of 30 seconds.

In another embodiment, the intermediate IS-IS system actively suppresses detection by retrieving the sequence number for its last sent LSA from a nonvolatile storage mechanism—e.g., a nonvolatile memory, a battery-backed RAM, a FLASH memory, a hard disk, memory that was not reset during or after an error condition, a dedicated or backup processor subsystem, or the functional equivalent—and transmitting a new LSA with a sequence number that is contiguous and sequential with that of the last sent LSA. In yet another embodiment, the contents of the new LSA message match the contents of the last sent LSA, the contents being retrieved from a nonvolatile storage mechanism.

After the intermediate IS-IS system has completed reinitialization, the system connects with its immediate neighbor IS-IS systems for data communications (Step 308). In one embodiment, this step includes the verification or maintenance of pre-existing connections with the neighbor IS-IS systems. Using the connections, the intermediate IS-IS system queries one or more immediate neighbor IS-IS systems for routing information by sending a "complete sequence numbers" PDU requesting the complete list from the neighbors' link state database (Step 312). In response to this PDU, the neighbor IS-IS systems broadcast their complete sequence lists, identifying each reachable neighbor IS-IS system contained in its database. Using this broadcast information, the reinitialized intermediate IS-IS system generates a routing table (Step 316) using conventional algorithmic means (such as Djikstra's algorithm, described in greater detail in Tanenbaum, Andrew. *Computer Networks*. 3d ed. New Jersey: Prentice-Hall: 1996) which in turn may be used to generate forwarding tables for one or more data planes.

In one embodiment, if the intermediate IS-IS system retained any routing information during the reinitialization process, it compares the broadcast information from its neighbor IS-IS systems against its retained information (Step 320). To the extent this comparison indicates a deficiency in the information received from the neighboring IS-IS systems, e.g., a missing host, the intermediate IS-IS system will generate a "partial sequence numbers" PDU for routing information relating to the deficiency and transmit it to the neighbor systems (Step 324). In this embodiment, the intermediate IS-IS system regenerates the routing table using the information supplied by the neighbor systems in response to the "partial sequence numbers" PDU (Step 328).

Figure 4:
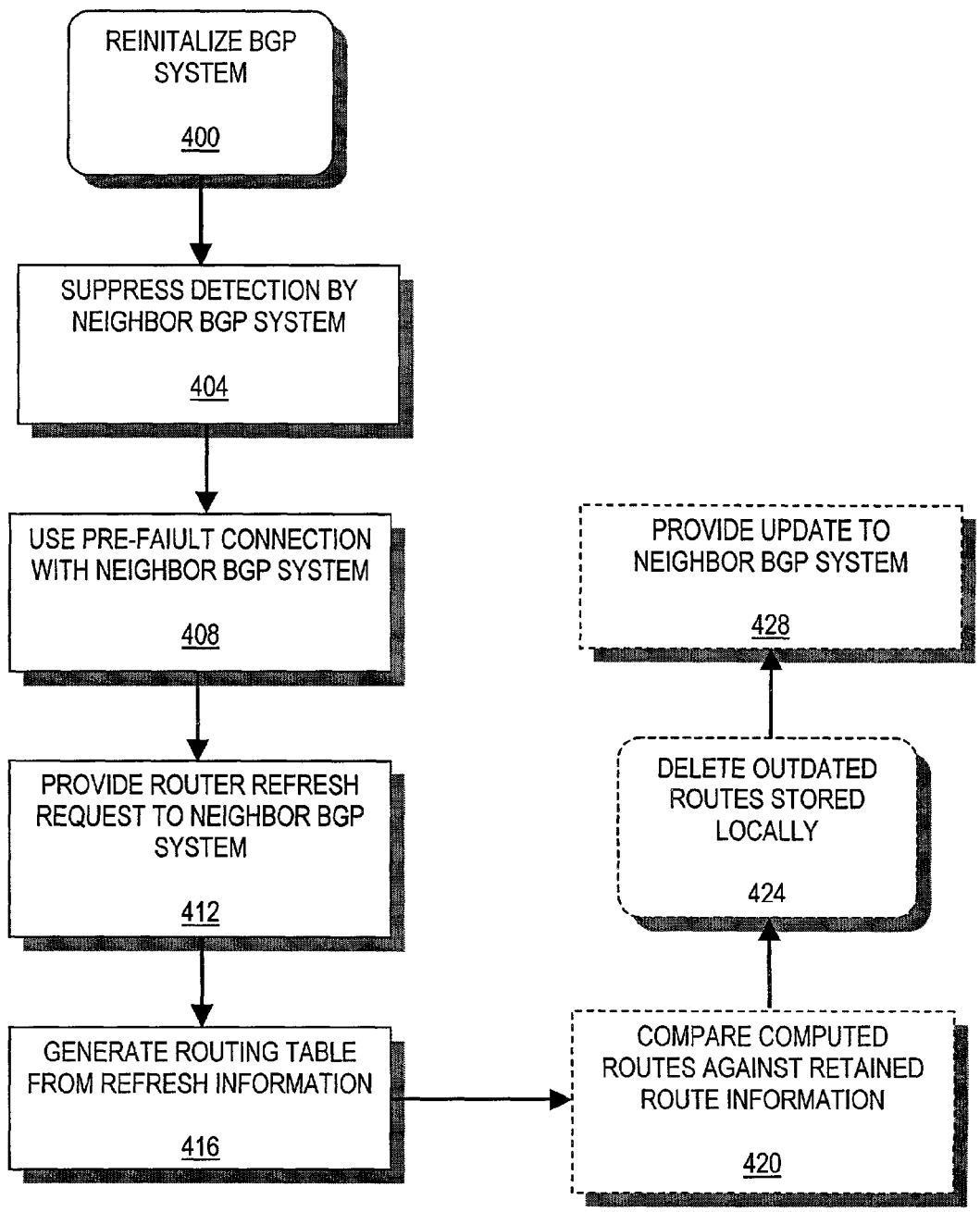
FIG. 4 is a flowchart illustrating an embodiment of a method for intermediate BGP system recovery from an operational failure in accord with the present invention.

FIG. 4 illustrates an embodiment of the present invention directed to intermediate systems that utilize the BGP protocol. An autonomous system (AS) is a network or collection of networks that have common routing policies and operate under a common administration. BGP is a routing protocol for use in autonomous systems to exchange network reachability information with other BGP speakers. BGP uses transport control protocol (TCP) as its transport-layer protocol and it therefore associates the following items with the state of a socket: internet layer attributes, TCP layer attributes, socket layer attributes, send and receive sequence pointers, received windows lengths, any data for reading, and any data awaiting acknowledgement. The BGP protocol is described in detail in RFC 1771, the entire contents of which are incorporated herein by reference.

Before, during, and after reinitialization (Step 400), the intermediate BGP system actively or passively suppresses detection of its reinitialization by its neighbor BGP systems (Step 404). In normal operation, a reinitialized BGP intermediate system will initiate a TCP socket connection to its neighboring BGP intermediate systems. In one embodiment, a reinitialized BGP intermediate system passively suppresses detection in accord with the present invention by not initiating a new TCP connection (Step 404), but instead using or reconstructing a pre-fault TCP connection using saved TCP state information (Step 408). The system reconstructs the TCP state associated with the connection by retrieving one or more of the send and receive sequence pointers, the received window lengths, and any data awaiting acknowledgement from a nonvolatile storage mechanism such a nonvolatile memory, a battery-backed RAM, a FLASH memory, a hard disk, memory that was not reset during or after an error condition, a dedicated or backup processor subsystem, or the functional equivalent. Using this information and the reconstructed state, the intermediate system begins using the reconstructed TCP socket, applying all the available options and control information to reconstruct the internet layer, TCP layer, and socket layer attributes, and responding to data that still needs to be acknowledged.

Once the TCP connection has been reconstructed, the data saved for transmission using the socket which has not been acknowledged according to the TCP protocol is transmitted to complete the last transmit of a BGP control packet. Additionally, any data arriving at the socket is read until the BGP marker (defined in RFC 1771) is detected in the data stream to indicate the start of a new BGP control packet. In this way the reinitializing BGP intermediate system can synchronize with the neighboring BGP intermediate system(s) without these system(s) detecting a fault.

Using the connection, the intermediate BGP system queries one or more immediate neighbor BGP systems for routing information (Step 412). In one embodiment, the intermediate BGP system sends route-refresh (RR) messages to one or more neighbor BGP systems requesting routing information. The intermediate BGP system will wait for a predetermined period of time before proceeding with the next step. Using this newly received routing information, the intermediate BGP system generates a routing table (Step 416) using conventional algorithmic means (i.e., the BGP decision process, defined in RFC 1771) which may be used to generate forwarding tables for one or more data planes. The intermediate BGP system may, optionally, provide this updated information to its neighbor intermediate BGP systems.

In one embodiment, if the intermediate BGP system retained any routing information during the reinitialization process, e.g., from the forwarding table in a data plane interface card, it compares the computed route information derived from the neighbor BGP systems' messages against its retained information (Step 420). Any route information that was originally retained by the intermediate BGP system, but is determined to be outdated after recomputation, is deleted (Step 424). These changes can also be provided to neighboring BGP systems to maintain synchronization (Step 428).

Many alterations and modifications may be made by those having ordinary skill in the art without departing from the spirit and scope of the invention. Therefore, it must be understood that the illustrated embodiment has been shown only for the purposes of example and should not be taken as limiting the invention, which is defined by the following claims. The claims are thus to be read as not only literally including what they set forth but also to include those equivalent elements which are insubstantially different from that which is claimed, even though they differ in some respects from what has been shown and described.

What is claimed is:

1. A method for recovering from an operational failure of an intermediate system, said method comprising the steps:
   (a) reinitializing a first intermediate system;
   (b) passively suppressing detection of the reinitialization by continuing control communications with a second intermediate system as if the first intermediate system had not experienced an operational failure; and
   (c) querying, by the first intermediate system, at least a third intermediate system for routing information.

2. The method of claim 1 wherein said second intermediate system and said third intermediate system are the same intermediate system.

3. The method of claim 1 further comprising the step: establishing a connection between said first intermediate system and said third intermediate system.

4. The method of claim 3 wherein the step of establishing the connection comprises the step of verifying a pre-existing connection with said third intermediate system.

5. The method of claim 3 wherein the step of establishing the connection comprises the step of retrieving connection information from a nonvolatile storage mechanism.

6. The method of claim 3 wherein the step of establishing the connection comprises the step of retrieving connection information from a microprocessor subsystem.

7. The method of claim 1 further comprising the step: receiving routing information from said third intermediate system.

8. The method of claim 7 wherein the received routing information comprises a list of network layer addresses directly reachable from said third intermediate system.

9. The method of claim 7 further comprising the step: generating a routing table from said received routing information.

10. The method of claim 9 wherein the routing table is generated from said received routing information at a control plane.

11. The method of claim 9 further comprising the step: generating a forwarding table from said routing table.

12. The method of claim 11 further comprising the step: providing said forwarding table to a data plane.

13. The method of claim 12 further comprising the step: forwarding data using said provided forwarding table.

14. The method of claim 5 further comprising the step: comparing said received routing information with retained routing information.

15. The method of claim 14 further comprising the step: generating routing information queries based on the result of said comparison.

16. The method of claim 15 wherein said routing information queries comprise at least one "partial sequence numbers" protocol data unit (PDU).

17. The method of claim 1 wherein step (b) comprises the suppression of messages to said second intermediate system relating to step (a).

18. A method for recovering from an operational failure of an intermediate system, said method comprising steps of:
   (a) reinitializing a first intermediate system;
   (b) operating, as if the first intermediate system had not experienced an operational failure, a control plane of the first intermediate system during at least a portion of the reinitialization to suppress the detection of the reinitialization by a second intermediate system; and
   (c) querying, by the first intermediate system, at least a third intermediate system for routing information.

19. The method of claim 18 wherein the step (b) comprises transmitting a plurality of control messages to said second intermediate system during at least the portion of the reinitialization.

20. The method of claim 1 wherein step (a) includes recovering information from a nonvolatile storage mechanism.

21. The method of claim 1 wherein step (a) includes recovering information from a microprocessor subsystem.

22. The method of claim 1 wherein said first, second, and third intermediate systems are intermediate systems using intermediate system-intermediate system (IS-IS) protocol.

23. The method of claim 22 wherein step (c) comprises transmitting at least one "complete sequence numbers" PDU to said third intermediate IS-IS system.

24. A method for recovering from an operational failure of an intermediate system, said method comprising the acts:
   (a) reinitializing a first intermediate system;
   (b) during the reinitialization, transmitting a plurality of "hello" PDUs at a frequency sufficient to convince said second intermediate system that said first intermediate system has not experienced the operational failure, each of the plurality of "hello" PDUs having content as if the first intermediate system had not experienced an operational failure; and
   (c) querying, by the first intermediate system, at least a third intermediate system for routing information.

25. The method of claim 24 further comprising the step of halting the transmission of "hello" PDUs if said first intermediate system fails to complete reinitialization within a predetermined period of time.

26. The method of claim 25 wherein said predetermined time period is approximately 30 seconds.

27. The method of claim 24 further comprising the steps of halting the transmission of "hello" PDUs if said first intermediate system fails to complete reinitialization within a predetermined period of time and all active neighboring intermediary systems have been polled.

28. The method of claim 3 wherein said first, second, and third intermediate systems are intermediate systems using border gateway protocol (BGP).

29. The method of claim 28 wherein said step of establishing a connection comprises the steps of retrieving one or more of send and receive sequence pointers, received window lengths, and any data awaiting acknowledgement from a nonvolatile storage mechanism.

30. The method of claim 29 further comprising the step of applying available options and control information to reconstruct at least one of internet layer attributes, TCP layer attributes, and socket layer attributes.

31. The method of claim 30 further comprising the step of responding to data awaiting acknowledgment.

32. The method of claim 28 wherein step (c) comprises the transmission of route-refresh (RR) messages to said third intermediate system.

33. The method of claim 9 wherein said first, second, and third intermediate systems are intermediate systems using border gateway protocol (BGP).

34. The method of claim 33 wherein said step of generating a routing table occurs after the receipt of at least one refresh message.

35. The method of claim 33 wherein said step of generating a routing table occurs after the lapse of a predetermined period of time.

36. The method of claim 35 further comprising the step of providing updated routing information to another intermediary system.

37. The method of claim 33 further comprising the step of comparing the generated routing information with retained routing information.

38. The method of claim 37 further comprising the step of deleting outdated routing information.

39. The method of claim 38 further comprising the step of providing updated routing information to another intermediate system.

40. The method of claim 18, further comprising a step of routing data using a data plane of the first intermediate system during at least the portion of the reinitialization in accord with a last-received forwarding table.

* * * * *